(12) United States Patent
Omar et al.

(10) Patent No.: US 7,251,486 B2
(45) Date of Patent: Jul. 31, 2007

(54) SYSTEM AND METHOD FOR ASSIGNING A NETWORK ADDRESS

(75) Inventors: Salim H. Omar, Waterloo (CA); Russell N. Owen, Waterloo (CA)

(73) Assignee: Research In Motion Limited, Waterloo (CA)

(*) Notice: Subject to any disclaimer, the term of this patent is extended or adjusted under 35 U.S.C. 154(b) by 0 days.

(21) Appl. No.: 11/510,376

(22) Filed: Aug. 25, 2006

(65) Prior Publication Data

US 2006/0286976 A1    Dec. 21, 2006

Related U.S. Application Data

(63) Continuation of application No. 10/831,263, filed on Apr. 23, 2004, now Pat. No. 7,120,438.

(51) Int. Cl.
*H04Q 7/20* (2006.01)
(52) U.S. Cl. .............. 455/435.1; 455/435.2; 455/435.3; 455/422.1; 455/428; 455/432.3; 455/433; 370/328; 370/338
(58) Field of Classification Search .......... 455/435.1, 455/435.2, 435.3, 422.1, 415, 428, 432.3, 455/433; 370/328–338; 709/203, 201
See application file for complete search history.

(56) References Cited

U.S. PATENT DOCUMENTS 5,835,725 A    11/1998  Chiang et al.
6,798,782 B1    9/2004  Caronni et al.
2003/0225912 A1* 12/2003  Takeda et al. ............... 709/246
2004/0156495 A1    8/2004  Chava et al.
2005/0013280 A1    1/2005  Buddhikot et al.
2005/0215250 A1    9/2005  Chava et al.

OTHER PUBLICATIONS

Enabling Location-Bases Services on Wireless LANs (Yen-Cheng Chen, Yao-Jung Chan, and Cheung-Wo She), Department of Information Management National Chi Nan University, 2003 IEEE.*
Tosi, D: "An Advanced Architecture for Push Services," Proceedings of the Fourth International Conference on Web Information Systems Engineering Workshops, IEEE, 2003, pp. 1-8, XP010697505.
Chen, et al.: "Enabling Location-Based Services on Wireless LANs," IEEE, Sep. 28, 2003, pp. 567-572, XP010682941.

* cited by examiner

*Primary Examiner*—Joseph Feild
*Assistant Examiner*—Khai Nguyen
(74) *Attorney, Agent, or Firm*—Jones Day; Krishna K. Pathiyal; Robert C. Liang

(57) ABSTRACT

A method relates to a network identification that uniquely identifies a communication device. The method includes determining a network address corresponding to the network identification. Another step is determining which device manager, of multiple device managers, is assigned the network address. Information and the network address is transmitted to the assigned device manager. The assigned device manager determines, from the network address, a device identification that identifies the wireless device within a communication device network. Using the device identification, the assigned device manager transmits the information to the device.

14 Claims, 8 Drawing Sheets

SYSTEM AND METHOD FOR ASSIGNING A NETWORK ADDRESS

CROSS-REFERENCE TO RELATED APPLICATION

This application is a continuation of U.S. patent application Ser. No. 10/831,263, filed Apr. 23, 2004, now U.S. Pat. No. 7,120,438 hereby incorporated herein by reference.

FIELD

This technology relates generally to wireless communications and assigning network addresses.

BACKGROUND

Systems for transmitting data to and from a wireless device are known in this field. The technology described in this patent application, however, overcomes many of the deficiencies of these known systems by providing unique network identifications for multiple wireless devices within the system that enable data to be transmitted through a computer network to a wireless device using a network address, such as an internet protocol (IP) address.

SUMMARY

A method relates to a network identification that uniquely identifies a communication device. The method includes determining a network address corresponding to the network identification. Another step is determining which device manager, of multiple device managers, is assigned the network address. Information and the network address is transmitted to the assigned device manager. The assigned device manager determines, from the network address, a device identification that identifies the wireless device within a communication device network. Using the device identification, the assigned device manager transmits the information to the device.

Preferably, the communication device is a wireless communication device, and the device network is a wireless network. Before the determining steps, the information and the network identification are received from a computer network server. The network identification includes a domain name and a host name.

DETAILED DESCRIPTION

Figure 1:
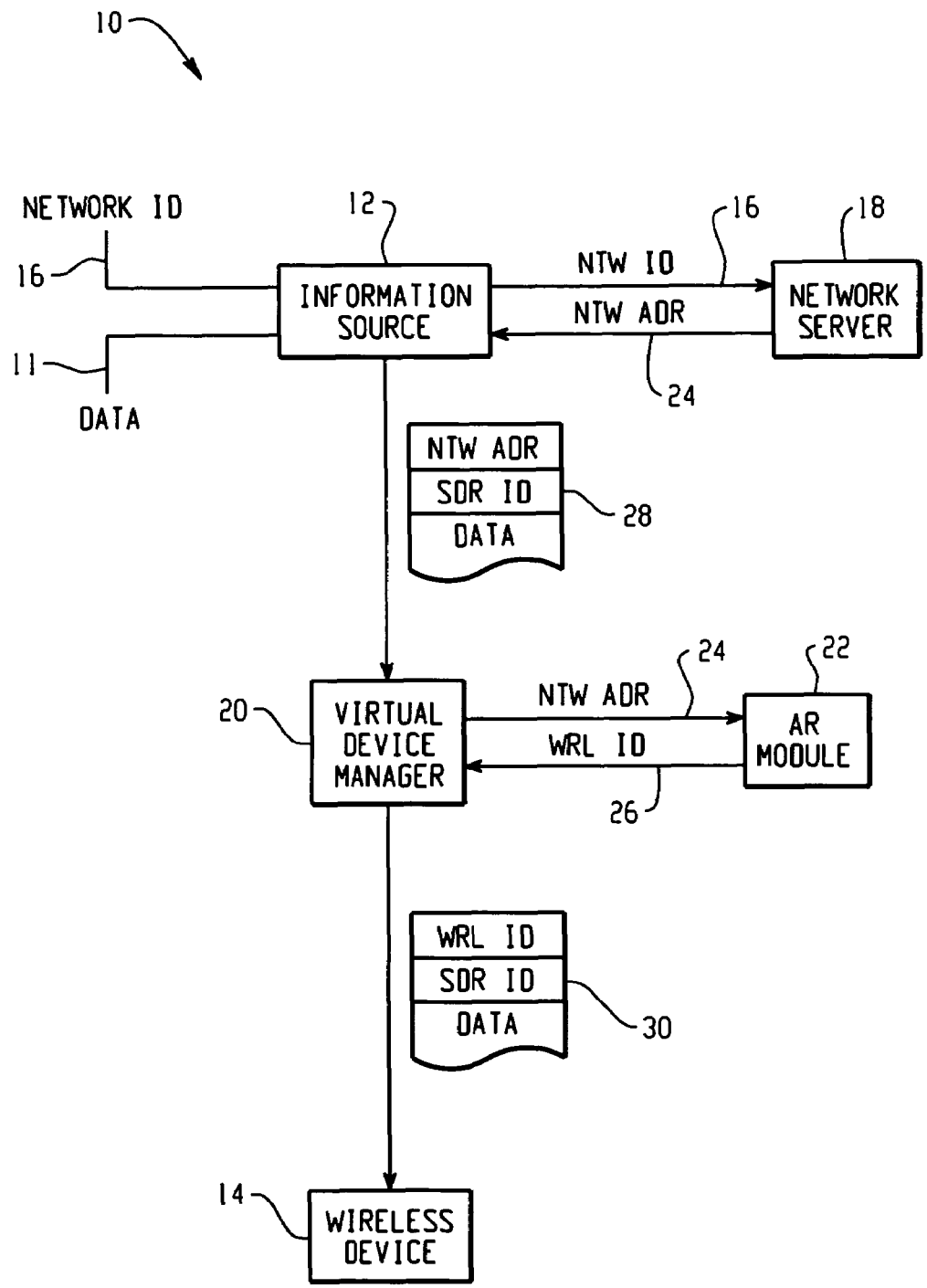
FIG. 1 is a diagram of an example system for pushing data from an information source to a wireless device using a network identification associated with the wireless device.

Referring now to the drawing figures, FIG. 1 is a diagram of an example system 10 for pushing data 11 from an information source 12 to a wireless device 14 using a network identification 16 associated with the wireless device 14. In addition to the information source 12 and wireless device 14, the system 10 includes a network server 18, a virtual device manager 20, and an address resolution (AR) module 22.

The information source 12 may, for example, be an Internet or web server, a software application executing on a processor coupled to a computer network, or some other type of information source capable of communicating with a computer network. The data 11 and network identification 16 may be stored in a memory device accessible by the information source 12, may be input to the information source 12 through a user interface or from another device or system, or may be acquired by the information source 12 using some other known method. The network identification 16 may, for example, identify both a host name for the wireless device 14 and a domain name for the network server 18, but could also be some other type of suitable network identification.

The network server 18 may, for example, be a domain name server (DNS) operating in a computer network. The network server 18 is operable to receive a network identification 16, such as a domain name and host name, and identify a network address 24 associated with the network identification 16. For example, in the case of a domain name server operating on a TCP/IP network, the network server 18 may receive a domain name identification and a host name identification, and resolve the domain and host names into an internet protocol (IP) address that identifies a device on the TCP/IP network that is associated with the host name.

The virtual device manager 20 may, for example, be a processing device operating in a computer network. The virtual device manager 20 may be accessed on the computer network using any of a plurality of network addresses, with each of the network addresses corresponding to a different wireless device. That is, the network address 24 corresponding to the wireless device 14 is assigned, either statically or dynamically, to the virtual device manager 20. In addition, network addresses corresponding to other wireless devices are also assigned to the virtual device manager 20, such that the virtual device manager 20 may service a group of wireless devices.

The address resolution (AR) module 22 may, for example, be a software module executing on a processing device operating in a computer network. In one embodiment, for example, the AR module 22 may be executed by the virtual device manager 20, or by another processor coupled through the computer network to the virtual device manager 20. The AR module 22 is operable to receive a network address 24, such as an IP address, and identify a wireless identification 26 for the wireless device 14 corresponding to the network address 24. For example, the AR module 22 may access a lookup table to match the network address 24 received by the virtual device manager 20 with a Mobile Access Number (MAN), or other type of wireless identification 26, that identifies the wireless device 14 within a wireless network.

The wireless device 14 may be any mobile communication device adapted to operate within a wireless network, and is preferably a two-way communication device. The operation of the wireless device 14 may vary dependent upon the wireless network in which the device 14 is intended to operate. For example, a wireless device 14 that operates in North American may include a communication subsystem designed to operate with the Mobitex™ mobile communication system or the DataTAC™ mobile communication system, whereas a wireless device 14 that operates in Europe may incorporate a General Packet Radio Service (GPRS) communication system. Thus, the format of the wireless identification 26 will depend upon the wireless protocol used by the particular wireless network in which the wireless device 14 operates. For example, wireless devices in the Mobitex network are identified using a Mobile Access Number (MAN).

In operation, the information source 12 receives a network identification 16, such as a domain name and host name identification, that is associated with the wireless device 14, and queries the network server 18 to determine a network address 24, such as an IP address, corresponding to the network identification 16. Using the network address 24, the information source 12 then transmits data 11 through a computer network to the virtual device manager 20. The information source may, for example, combine the network address 24 with the data 11 in accordance with a network data transfer protocol in order to transfer the resultant data packet 28 over a computer network to the virtual device manager 20. The data packet 28 may also include a sender identification for the information source (SDR ID), such as an IP address or domain name, to enable two-way communication with the wireless device 14. Upon receiving the data packet 28 from the information source 12, the virtual device manager 20 queries the address resolution module 22 to determine a wireless identification 26, such as a MAN, for the wireless device 14 corresponding to the network address 24. The wireless identification 26 is then combined with the data 11 and the sender identification (SDR ID), for example in accordance with an appropriate wireless protocol, and the resultant data packet 30 is transmitted to the wireless device 14 over the wireless network.

Figure 2:
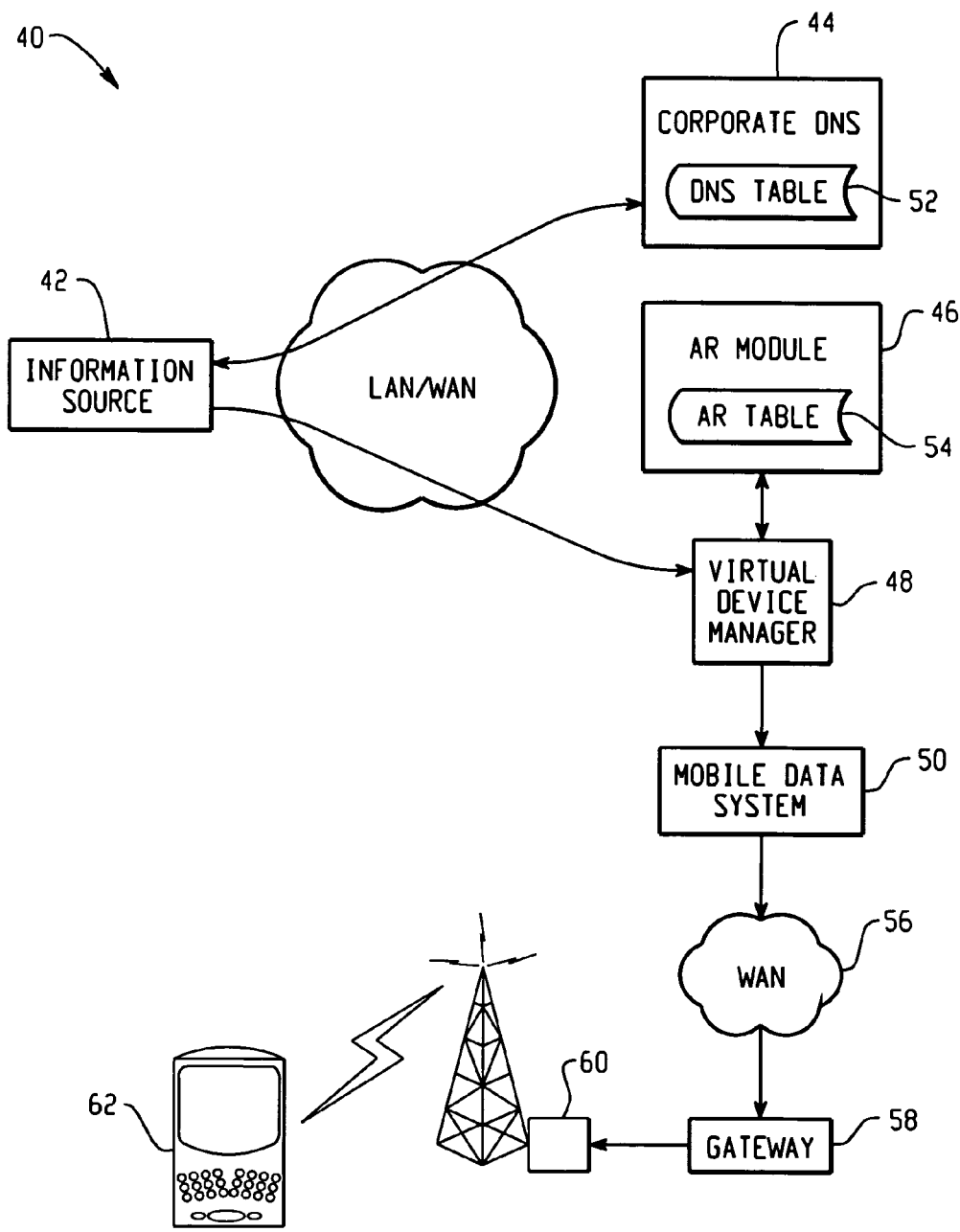
FIG. 2 is a diagram illustrating one example implementation of the system of FIG. 1.

FIG. 2 is a diagram illustrating one example implementation 40 of the system 10 shown in FIG. 1. This embodiment 40 includes an information source 42, a domain name server (DNS) 44, an address resolution (AR) module 46, a virtual device manager 48, and a mobile data system 50. The system 40 also includes a DNS table 52 accessible by the DNS 44 and an AR table 54 accessible by the AR module 46. Also illustrated are a wireless gateway 58, a wireless network 60, and a wireless device 62.

The DNS 44, AR module 46, virtual device manager 48, and mobile data system 50 are preferably included within the same local area network (LAN) and protected behind a common firewall. The information source 42 is preferably also included within the LAN and protected behind the common firewall, but may alternatively communicate with the LAN through a wide area network (WAN).

The information source 42 uses a network identification to push data over a virtual TCP/IP connection to the wireless device 62. In this embodiment, the network identification associated with the wireless device 62 preferably includes a host name that identifies the wireless device 62 and a domain name that identifies the DNS 44. (See, e.g., FIG. 3). Using the network identification, the information source 42 queries the DNS 44 through the LAN or WAN for a network address associated with the wireless device 62. The network address may, for example, be determined by the DNS 44 by matching the network identification to a corresponding network address in the DNS table 52.

The network address is preferably one of a plurality of IP addresses assigned to the virtual device manager 48. The configuration of the virtual device manager 48 within the local area network is based on a networking technique called virtual host technology in which multiple IP addresses are assigned to a single device, either statically or dynamically. The IP addresses assigned to the virtual device manager 48 may be tied to one network interface or to multiple network interfaces, using a networking technique called virtual interface binding. This network configuration provides a virtual TCP/IP stack for each IP address assigned to the virtual device manager 48, enabling the virtual device manager 48 to simulate multiple virtual devices, each having a TCP/IP stack.

Using the network address, the information source 42 transmits the data through the LAN or WAN to the virtual device manager 48. The virtual device manager 48 then queries the AR module 46, preferably using a standard address resolution protocol, to resolve the network address into a wireless identification, such as a MAN, that identifies the wireless device 62 within the wireless network 60. The AR module 46 may, for example, resolve the network address by matching it to a corresponding wireless identification in the AR table 54. (See, e.g., FIG. 3) The AR table 54 may, for example, be a database that is stored in a memory device accessible by the AR module 46.

The mobile data system 50 receives the data and wireless identification from the virtual device manager 48. The mobile data system 50 is a secure gateway between the virtual device manager 48 within the corporate LAN and a wide area network (WAN) 56, such as the Internet, and transmits the data and wireless identification over the WAN 56 to the wireless gateway 58. The mobile data system 50 preferably also converts the data into a format compatible with the wireless device 62, encrypts and compresses the data into a data packet, and formats the data packet and wireless identification for transmission over the WAN 58 to the wireless gateway 58. The mobile data system 50 may also perform additional functions, as described in the following co-owned PCT applications, which are hereby incorporated into the present application by reference: International Application No. PCT/CA02/01074, entitled System And Method For Pushing Data From An Information Source To A Mobile Communication Device Including Transcoding Of the Data, filed Jul. 12, 2002; International Application No. PCT/CA02/01072, entitled System And Method For Providing Remote Data Access For A Mobile Communication Device, filed Jul. 12, 2002; International Application No. PCT/CA02/01073, entitled System And Method For Providing Remote Data Access And Transcoding For A Mobile Communication Device, filed Jul. 12, 2002. In these related applications, however, the mobile data system 50 is instead referred to as an "IP Proxy." The terms "mobile data system" and "MDS" as used in the present application are therefore synonymous with the term "IP Proxy" as used in the above-referenced incorporated applications.

The wireless gateway 58 provides an interface between the WAN 56 and the wireless network 60, which transmits the data packet to the wireless device 62. The wireless gateway 58 may, for example, convert the data between WAN protocols and wireless network protocols, address the data packet for transmission over the wireless network using the wireless identification, store and forward data to and from the wireless device 62, and perform other typical interface functions.

Figure 3:
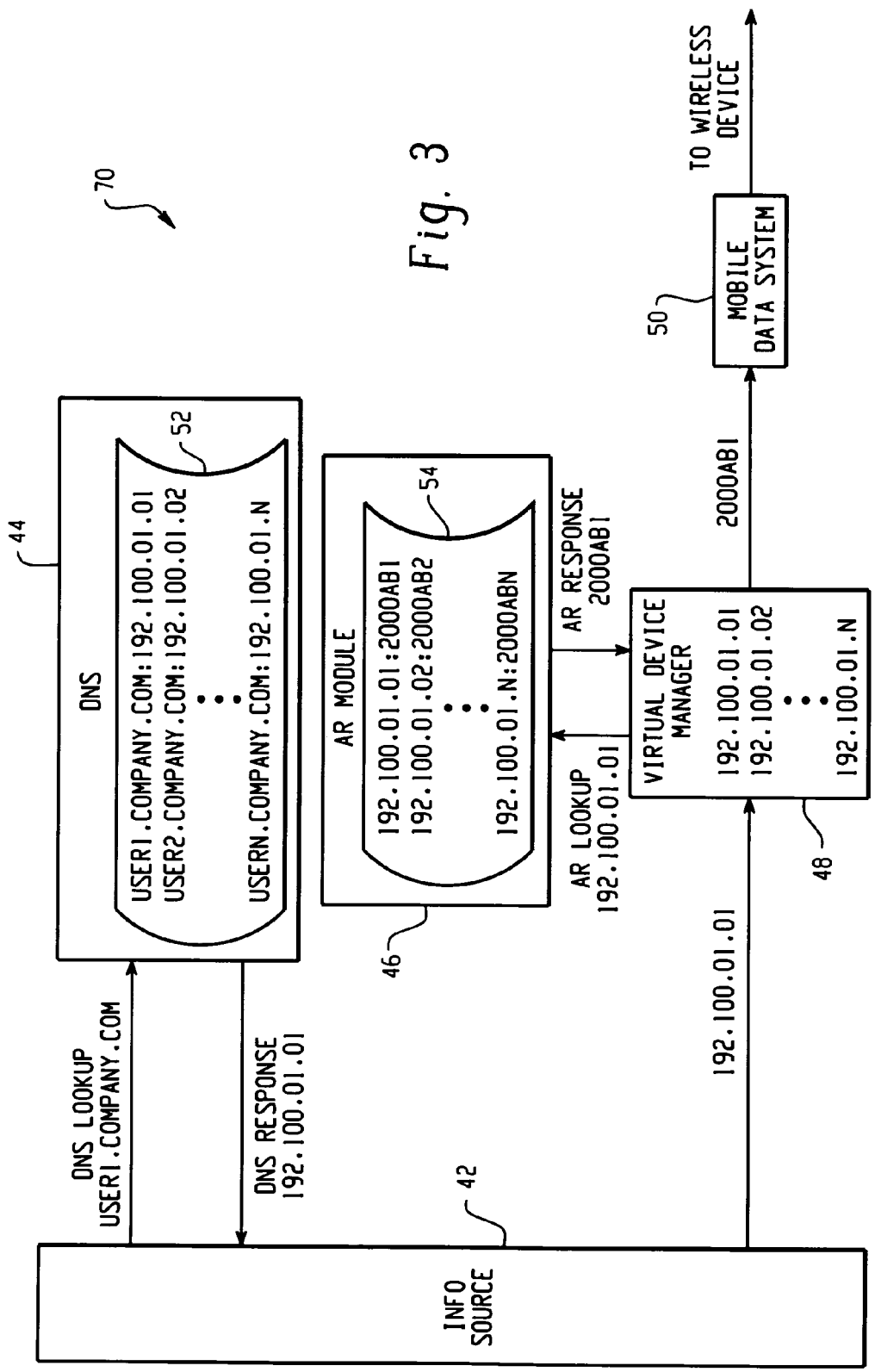
FIG. 3 is a diagram showing one example of how data may be pushed from an information source to a wireless device using the system of FIG. 2.

FIG. 3 is a diagram 70 showing one example of how data may be pushed from an information source 42 to a wireless device 62 using the system of FIG. 2. In this example, the information source 42 first queries the DNS 44 to resolve the network identification "USER1.COMPANY.COM" into an IP address. In this case, the host name "USER1" corresponds to the particular wireless device 62 to which the information is to be delivered. Using the DNS table 52, the DNS 44 determines the IP address (192.100.01.01) corresponding to the network identification "USER1.COMPANY.COM," and transmits the IP address over the network as a response to the information source 42. As illustrated, the DNS table 52 may include a plurality (1–N) of network identifications and a corresponding plurality (1–N) of network addresses.

Having resolved the network identification, the information source 42 uses the resultant IP address (192.100.01.01) to transmit the data through the LAN to the virtual device manager 48. As illustrated, the virtual device manager 48 is assigned a plurality (1–N) of IP addresses in the network (i.e., 192.100.01.01-192.100.01.N), in order to emulate a TCP/IP stack for multiple wireless devices having access to the system. The virtual device manager 48 then queries the AR module 46 to resolve the IP address (192.100.01.01) into an identification (2000AB1) of the wireless device 62 within the wireless network 60, as described above. The data and wireless identification (2000AB1) are then transmitted to the mobile data system 50, which prepares the data for transport over the WAN 56 to the wireless gateway 58, as described above.

Figure 4:
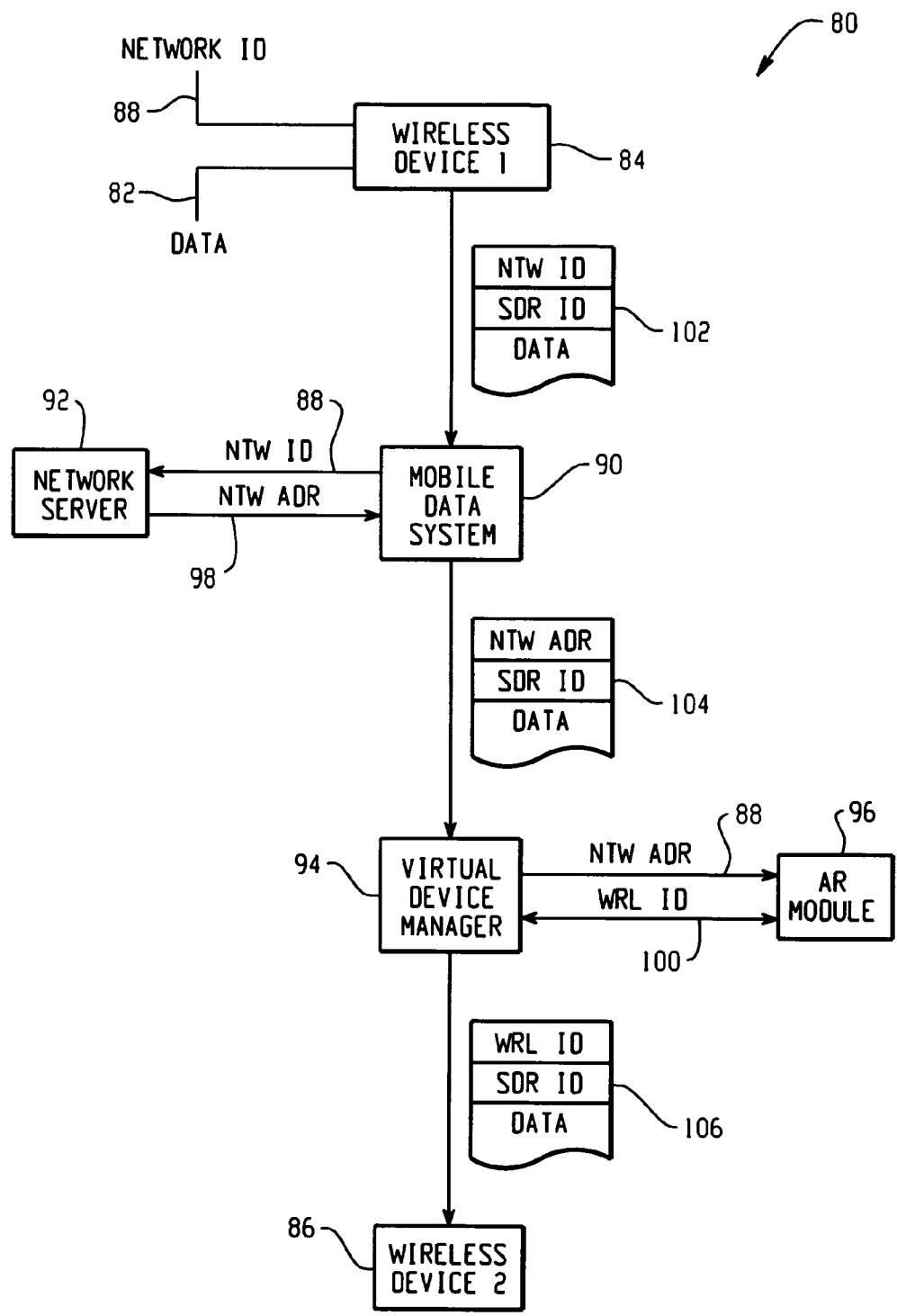
FIG. 4 is a diagram of an example system for transmitting data from a first wireless device through a computer network to a second wireless device using a network identification associated with the second wireless device.

FIG. 4 is a diagram of an example system for transmitting data 82 from a first wireless device 84 through a computer network to a second wireless device 86 using a network identification 88 associated with the second wireless device 86. In addition to the first and second wireless devices 84, 86, the system 80 includes a mobile data system 90, a network server 92, a virtual device manager 94, and an address resolution (AR) module 96.

The first and second wireless devices 84, 86 may be any two-way mobile communication devices adapted to operate within a wireless network. The network identification 88 and data 82 may be stored in a memory device on the first wireless device 84, or may be input to the wireless device 84, for example through a user interface. The network identification 88 may, for example, include a host name for the second wireless device 86 and a domain name for the network server 92, but could alternatively be some other type of identification that uniquely identifies the second wireless device 86 within a computer network.

The mobile data system 90 may, for example, be a processing device operating in a computer network. The mobile data system 90 is operable to communicate with the first wireless device via the wireless network and receive the data 82 and network identification 88 from the first wireless device 84. In addition, the mobile data system 90 is coupled through a computer network to the network server 92 and the virtual device manager 94. In alternative embodiments, however, the mobile data system 90 may operate on the same processor as the network server 92 and/or the virtual device manager 94.

The network server 92 may, for example, be a domain name server (DNS) operating in the computer network. The network server 92 is operable to receive the network identification 88 from the mobile data system 90 and identify a network address 98, such as an IP address, associated with the network identification 88.

The virtual device manager 94 may, for example, be a processing device operating in the computer network. The virtual device manager 94, similar to the virtual device manager 20 described above with reference to FIG. 1, may be accessed on the computer network using any of a plurality of network addresses, with each network address corresponding to a different wireless device. The address resolution (AR) module 96, similar to the AR module 22 of FIG. 1, may be a software module executing on a processing device operating in the computer network, and in one embodiment may be executed by the virtual device manager 94. The AR module 96 is operable to receive the network address 98 and identify a corresponding wireless identification 100 for the second wireless device 86.

In operation, the first wireless device 84 receives data 82 and a network identification 88 that is associated with the second wireless device 86, and combines the network identification 88 and data 82 into a data packet 102 for transmission over a wireless network and to the mobile data system 90. The data packet 102 may also include a sender identification (SDR ID) for the first wireless device, such as a network identification, IP address, or wireless identification, to enable two-way communication with the second wireless device. The mobile data system 90 then queries the network server 92 to resolve the network identification 88 into a network address 98, such as an IP address. Using the network address 98, the mobile data system 90 transmits the data 82 through the computer network to the virtual device manager 20. The mobile data system 90 may, for example, combine the network address 98 with the data 82 and sender identification (SDR ID) in accordance with a network data transfer protocol in order to transfer the resultant data packet 104 over the computer network to the virtual device manager 94. Upon receiving the data packet 104 from the information source, the virtual device manager 94 queries the AR module 96 to determine a wireless identification 100, such as a MAN, for the second wireless device. The wireless identification 100 is then combined with the data 82 and sender identification (SDR ID) in accordance with the appropriate wireless network protocol, and the resultant data packet 106 is transmitted over the wireless network to the second wireless device 86.

Figure 5:
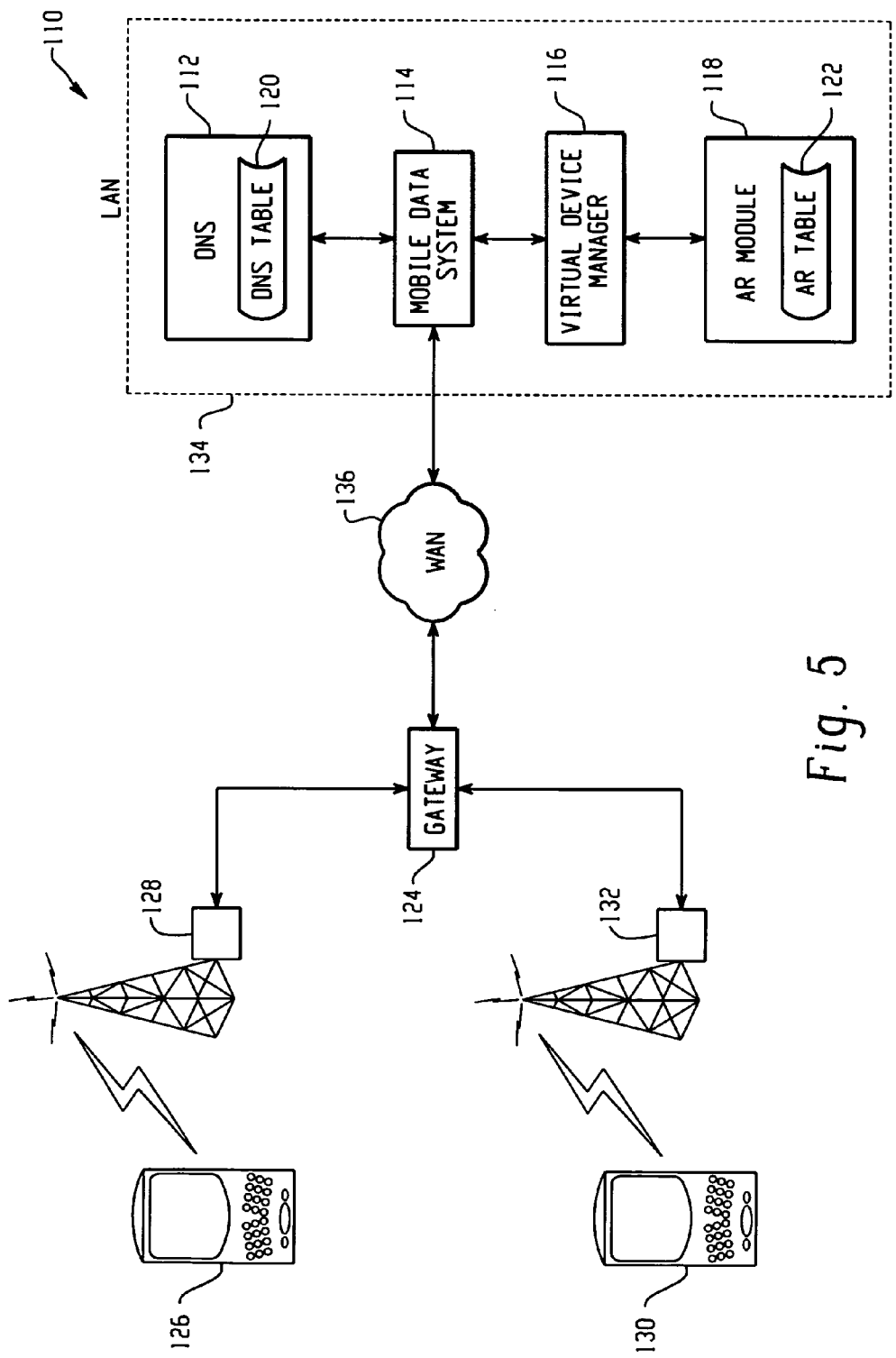
FIG. 5 is a diagram illustrating one example implementation of the system of FIG. 4 in which the first and second wireless devices are associated with the same computer network.

FIG. 5 is a diagram illustrating one example implementation 110 of the system 80 of FIG. 4. This embodiment 110 includes a domain name server (DNS) 112, a mobile data system 114, a virtual device manager 116, and an address resolution (AR) module 118. The system also includes a DNS table 120 accessible by the DNS 44 and an AR table 122 accessible by the AR module 118. Also illustrated are a wireless gateway 124, a first mobile device 126 operating within a first wireless network 128, and a second wireless device 130 operating within a second wireless network 132.

The DNS 112, mobile data system 114, virtual device manager 116, and AR module 118 are preferably included within the same local area network (LAN) 134, and are preferably separated from a wide area network (WAN) 136, such as the Internet, by a common firewall. The first and second wireless devices 126, 130 may operate within different wireless networks 128, 132, as illustrated, but could alternatively operate within the same wireless network.

In operation, data may be transmitted between the first and second wireless devices 126, 130 using unique network identifications assigned to each of the wireless devices 126, 130. For example, in order to transmit data from the first wireless device 126 to the second wireless device 130, a network identification for the second wireless device 130, such as a domain name and host name identification, may be input to the first wireless device 126 through a user interface. The first wireless device 126 may then format the data and network identification using the appropriate wireless protocol, and transmit the resultant data packet over the wireless network 128 to the wireless gateway 124.

The wireless gateway 124 provides an interface between the wireless network(s) 128, 132 and the WAN 136, similar to the wireless gateway 58 described above with reference to FIG. 2. The wireless gateway 124 reformats the data for transmission over the WAN 136 and transmits the data to the mobile data system 114.

The mobile data system 114 is a secure gateway between the LAN 134 and the WAN 136, similar to the mobile data system 50 described above with reference to FIG. 2. Upon receiving data and a network identification from the WAN 1136, the mobile data system 114 queries the DNS 114 to resolve the network identification into a network address, such as an IP address, associated with the second wireless device 130. The network address may, for example, be determined by the DNS 112 by matching the network identification to a corresponding network address in the DNS table 120. As described above with reference to FIG. 2, the network address is preferably one of a plurality of IP addresses assigned to the virtual device manager 48, which simulates a TCP/IP stack for multiple mobile devices 126, 130 within the system 110.

Having received the network address from the DNS 112, the mobile data system 114 uses the network address transfer the data to the virtual device manager 116 through the LAN 134. The virtual device manager 116 queries the AR module 118, preferably using a standard address resolution protocol, to resolve the network address into a wireless identification, such as a MAN, that identifies the second wireless device 130 within the wireless network 132. The AR module 118 may, for example, resolve the network address by matching it to a corresponding wireless identification in the AR table 122. (See, e.g., FIG. 6). The AR table 122 may, for example, be a database in a memory device accessible by the AR module 46. Having resolved the network address into a wireless identification, the virtual device manager 116 then sends the data and wireless identification back through the LAN to the mobile data system 114 for transmission to the second wireless device 130.

The mobile data system 114 formats the wireless identification and the data, and transmits the resultant data packet over the WAN 136 to the wireless gateway 124. In addition, the mobile data system 114 may also convert the data into a format compatible with the wireless device 130, encrypt and compress the data, and perform additional functions, as described above with reference to FIG. 2. The wireless gateway 124 then converts the data packet from the mobile data system 114 into a wireless network protocol, addresses the data packet for transmission over the wireless network 132 using the wireless identification, and transmits the data to the wireless device 130. As noted above, the wireless gateway 124 may also perform other interface functions, for instance in the case of multiple wireless networks 128, 132, the wireless gateway 124 may determine which of the wireless networks 128, 132 was last in communication with the wireless device 130.

Figure 6:
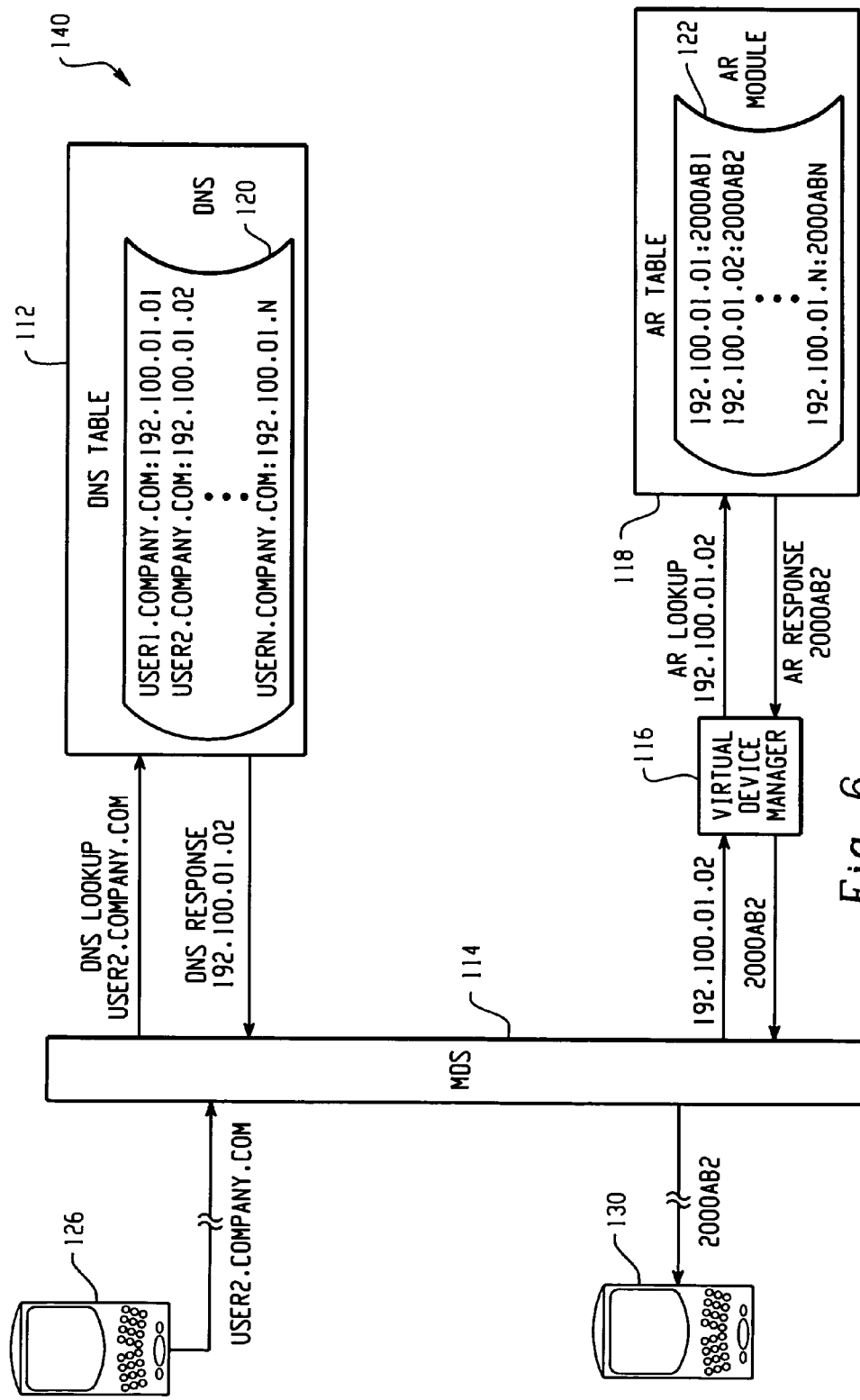
FIG. 6 is a diagram showing one example of how data may be transmitted from a first wireless device to a second wireless device using the system of FIG. 5.

FIG. 6 is a diagram 140 showing one example of how data may be transmitted from a first wireless device 126 to a second wireless device 130 using the system 110 of FIG. 5. In this example, the first wireless device 126 transmits data to the mobile data system (MDS) 114 addressed with the network identification "USER2.COMPANY.COM." The host name "USER2" in this example identifies the second wireless device 130. The MDS 114 then queries the DNS 112 to resolve the domain name and host name into the IP address "192.100.01.02" using the DNS table 120. As illustrated, the DNS table 120 includes a plurality (1–N) of network identifications and a corresponding plurality (1–N) of network addresses.

With the IP address (192.100.01.02) from the DNS table 120, the MDS 114 opens a network connection with the virtual device manager 116, and sends the data to the virtual device manager 116 in order to resolve the IP address into a corresponding wireless identification (2000AB2) for the second wireless device 130. As described above, the virtual device manager 116 is assigned a plurality (1–N) of IP addresses in the network (i.e., 192.100.01.01-192.100.01.N), in order to emulate a TCP/IP stack for multiple wireless devices 126, 130. The virtual device manager 116 queries the AR module 118 to resolve the IP address (192.100.01.02) into the wireless identification (2000AB2) using the AR table 122. The data from the first wireless device 126 along with the wireless identification (2000AB2) are then transmitted back to the MDS 114, and from the MDS 114 to the second wireless device 130, as described above.

Figure 7:
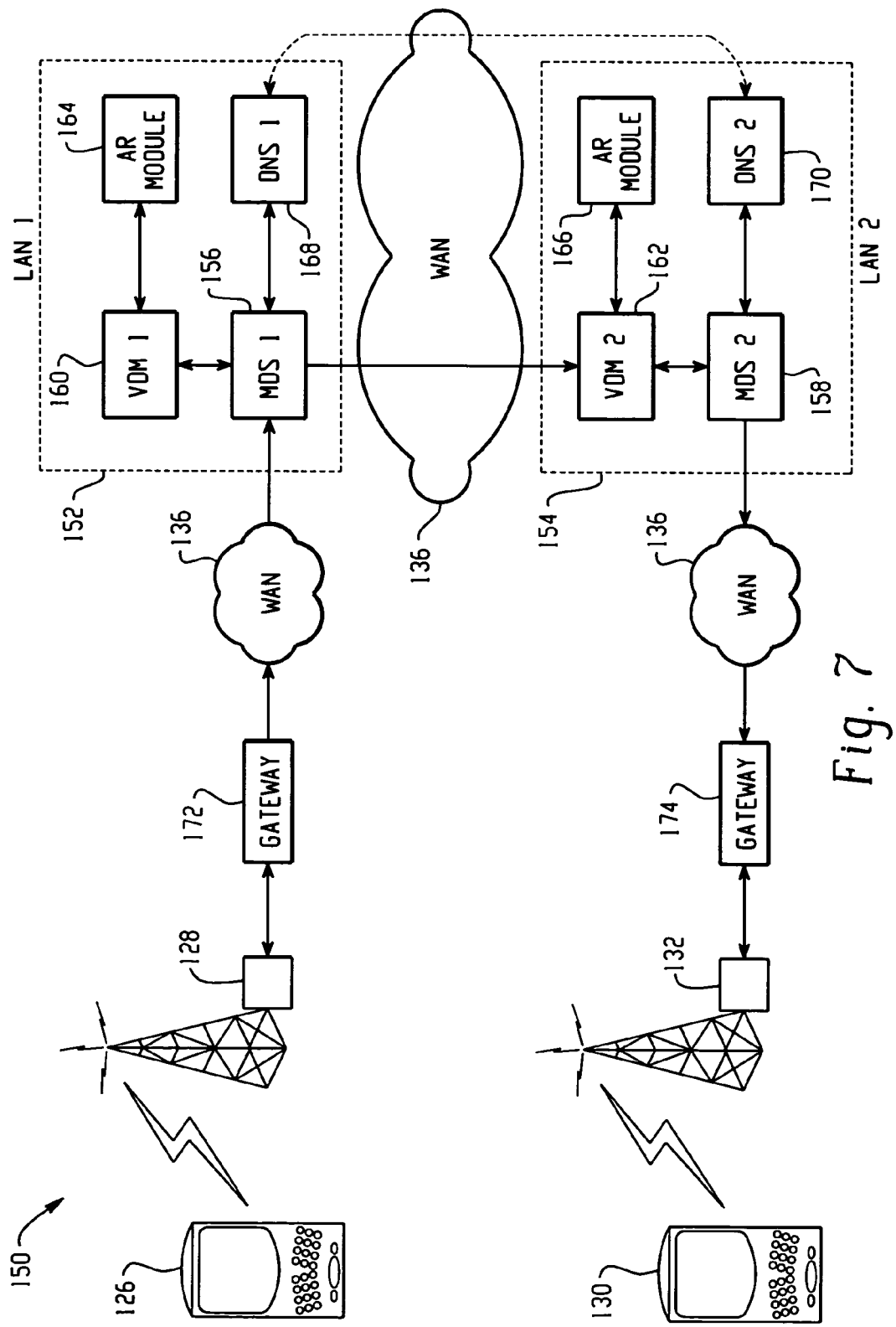
FIGS. 7 and 8 are diagrams illustrating example implementations of the system of FIG. 4 in which the first and second wireless devices are associated with different computer networks.

FIG. 7 is a diagram illustrating one example implementation 150 of the system 80 of FIG. 4 in which the first and second wireless devices 126, 130 are associated with different local area networks 152, 154. Both local area networks 152, 154 include a mobile data system (MDS 1 and MDS 2) 156, 158, a virtual device module (VDM 1 and VDM 2) 160, 162, an address resolution (AR) module 164, 166, and a domain name server (DNS 1 and DNS 2) 168, 170. Also illustrated are the first wireless device 126 operating with a first wireless network 128 and a first wireless gateway 172, and the second wireless device 130 operating with a second wireless network 132 and a second wireless gateway 174. It should be understood, however, that in other embodiments the first and second wireless devices 126, 130 may operate within the same wireless network. It should also be understood that the system 150 could alternatively include a single wireless gateway that interfaces multiple wireless networks 128, 132 to the wide area network (WAN) 136.

Similar to the system 110 described above with reference to FIG. 5, data may be transmitted in this system 150 between the first and second wireless devices 126, 130 using unique network identifications assigned to each of the wireless devices 126, 130. For example, in order to transmit data from the first wireless device 126 to the second wireless device 130, a network identification for the second wireless device may be input to the first wireless device 126 through a user interface. The first wireless device 126 formats the data and network identification for wireless transmission, and transmits the resultant data packet over the wireless network 128 to the first wireless gateway 172. The wireless gateway 172 reformats the data and network identification for transmission over the WAN 136 and forwards it to the MDS 156 in the first LAN 152.

Upon receiving the data and network identification from the WAN 136, the MDS 156 in the first LAN 152 queries the DNS 168 to resolve the network identification. Because the second wireless device 130 in this embodiment 150 operates in association with the second LAN 154, however, the network identification should identify the second LAN 154. For example, the network identification may include a host name identifying the second wireless device 130 and a domain name identifying the DNS 170 in the second LAN 154. Therefore, upon being queried with the network identification, the DNS 168 in the first LAN 152 instructs its MDS 156 to forward the data through the WAN 136 to the virtual device manager (VDM) 162 in the second LAN 154. The DNS 168 may, for example, access the DNS 170 in the second LAN 154 to provide the MDS 156 with a network address within the WAN 136 for the VDM 162.

Similar to the virtual device managers described above, the VDM 162 in the second LAN is preferably assigned a plurality of network addresses in order to simulate a TCP/IP stack for multiple mobile devices operating in association with the second LAN 154, including the second mobile device 130. Having received the data and network address from the first LAN 152, the VDM 162 queries the AR module 166 in the second LAN 154 to resolve the network address into a wireless identification, such as a MAN, that identifies the second wireless device 130 within the wireless network 132. The data and wireless identification are then forwarded to the MDS 158.

The MDS 158 in the second LAN 154 formats the wireless identification and data and transmits it over the WAN 136 to the second wireless gateway 124. The MDS 158 may also encrypt and compress the data, and perform additional functions as described above. The second wireless gateway 174 converts the data packet received from the MDS 158 in the second LAN into a wireless network protocol, addresses the reformatted data using the wireless identification, and transmits the resultant data packet over the wireless network 132 to the second wireless device 130.

Figure 8:
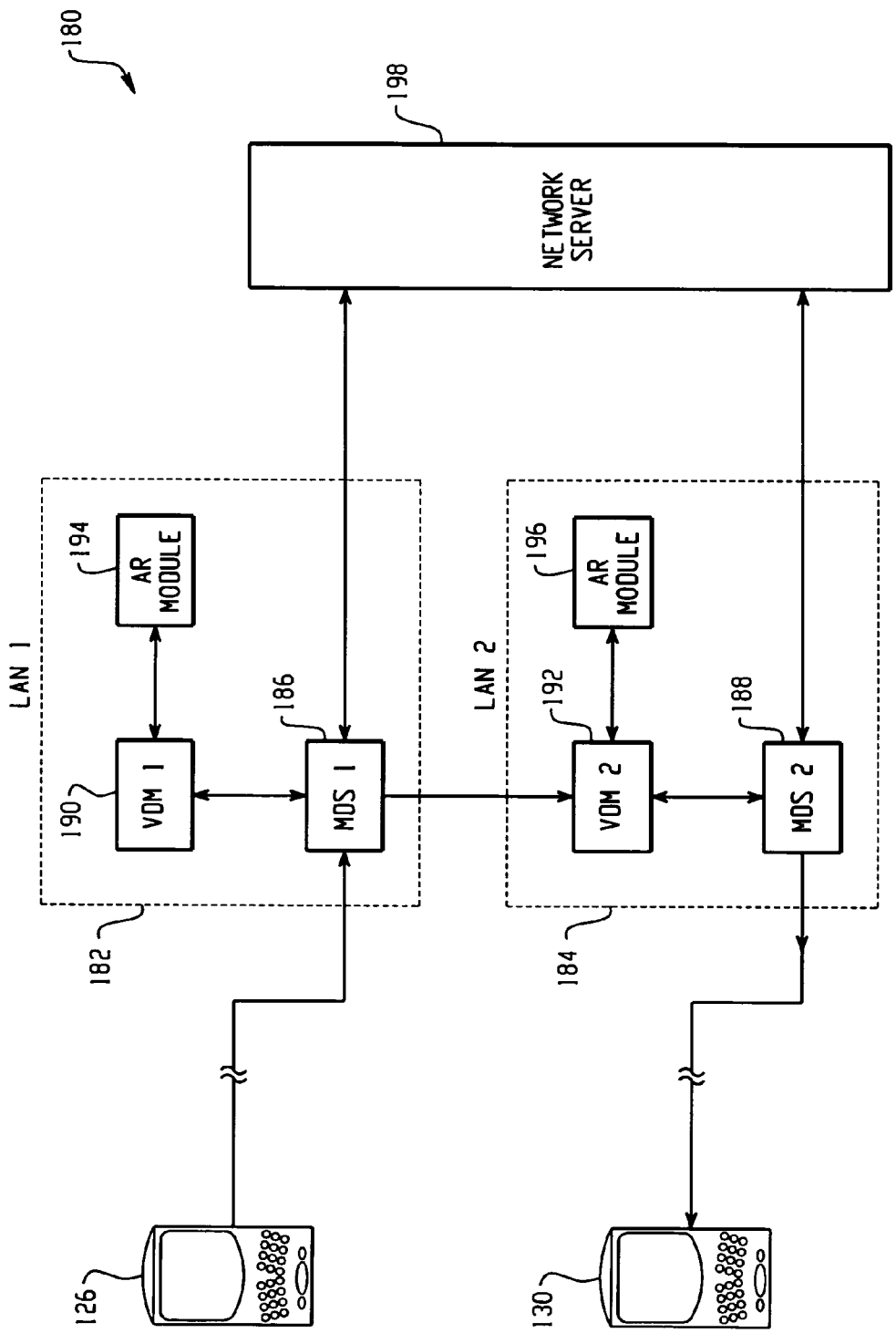

FIG. 8 is a diagram illustrating another example implementation 180 of the system 80 of FIG. 4 in which the first and second wireless devices 126, 130 are associated with different local area networks 182, 184. Both local area networks 182, 184 include a mobile data system (MDS 1 and MDS 2) 186, 188, a virtual device module (VDM 1 and VDM 2) 190, 192, and an address resolution (AR) module 194, 196. In addition, each of the local area networks 182, 184 are coupled to a common network server 198.

Similar to the system 150 described above with reference to FIG. 7, data may be transmitted in this system 180 from the first wireless device 126 to the second wireless device 130 via one or more wireless networks 128, 132 and a wide area network (WAN) 136. For convenience, however, the wireless network(s) 128, 132, wireless gateway(s) 172, 174, and wide area network (WAN) 136 are not illustrated in FIG. 8.

In the system 180 of FIG. 8, a data packet destined for the second wireless device 130 is transmitted from the first wireless device 126 to the MDS 186 in the first LAN 182. In addition to its payload data, the data packet transmitted from the first wireless device 126 may include a sender identification of the first wireless device 126, such as a wireless network identification, and either a network identification or a network address uniquely identifying the second wireless device 130. For example, the data packet may be addressed with an IP address in the second LAN 184 that is associated with the second wireless device 130, or may be addressed with a unique network identification, as described above.

Upon receiving the data packet from the first wireless device 126, the MDS 186 in the first LAN 182 queries the AR module 194 to resolve the sender identification of the first wireless device 126 into a unique network address, such as an IP address, associated with the first wireless device 126. The AR module 194 may, for example, resolve the sender identification by matching it to a corresponding network identification in an address resolution (AR) table. Similar to those described above, the network address of the first wireless device 126 is preferably one of a plurality of IP addresses assigned to the VDM 190 in the first LAN 182, which simulates a TCP/IP stack for multiple mobile devices.

In addition, the MDS 186 in the first LAN 182 also opens a communication link with the network server 198, for example through a WAN. The network server 198 maintains a table, such as an electronic database, that associates unique network identifications for the wireless devices 126, 130 with network addresses in the first or second LAN 182, 184. The MDS 186 queries the network server 198 to resolve the network address for the first wireless device 126 into a network identification for the first wireless device. In addition, if the network address for the second wireless device 130 was not provided in the data packet transmitted from the first wireless device 126, then the MDS 186 also queries the network server 198 to resolve the network identification of the second wireless device 130 into a network address, such as an IP address, in the second LAN 184.

With the network address for the second wireless device 130, the MDS 186 opens a connection, for example through a WAN, to transmit the data and network identification of the first wireless device 126 to the VDM 192 in the second LAN 184. Similar to those described above, the network address of the second wireless device 130 is preferably one of a plurality of IP addresses assigned to the VDM 192 in the second LAN 184. Having received the data and network identification from the first LAN 182, the VDM 192 in the second LAN 184 queries the AR module 196 to resolve the network address for the second wireless device 130 into a wireless identification, such as a MAC address, that identifies the second wireless device 130 within a wireless network.

From the VDM 192, the data is forwarded to the MDS 188 along with the wireless identification of the second wireless device 130 and the network identification of the first wireless device 126. The MDS 188 opens a connection with the network server 198, for example over a WAN, and queries the network server 198 to resolve the network identification of the first wireless device 126 into the associated network address. The MDS 188 then formats the data for transmission to the second wireless device 130 along with the wireless identification of the second wireless device 130 and the network address and network identification for the first wireless device 126.

This written description uses examples to disclose the invention, including the best mode, and also to enable a person skilled in the art to make and use the invention. The patentable scope of the invention is defined by the claims, and may include other examples that occur to those skilled in the art.

The invention claimed is:

1. A method comprising:
   determining, from a network identification that uniquely identifies a communication device, a network address corresponding to the network identification;
   using the network address to transmit information to a device manager, the device manager being accessible using any of a plurality of network addresses, the plurality of network addresses including the network address associated with the communication device and each of the plurality of network addresses corresponding to a different one of a plurality of communication devices that are accessible via the device manager;

determining, by the device manager and from the network address, a device identification that identifies the communication device within a communication device network; and transmitting, by the assigned device manager, the information to the device using the device identification.

2. The method of claim 1 wherein the communication device is a wireless communication device and the device network is a wireless network.

3. The method of claim 1 further comprising, before the determining steps, a step of receiving the information and the network identification from a computer network server.

4. The method of claim 1 wherein the network identification includes a domain name and a host name.

5. The method of claim 1 where in the network is a TCP/IP computer network.

6. The method of claim 1 wherein the network address is an internet protocol (IP) address.

7. A method comprising:

receiving information and a network identification from a first communication device that communicates through a first network, the network identification uniquely identifying a second communication device that communicates though a second network;

determining a internet protocol (IP) address that is associated with the network identification;

using the IP address to transmit the information to a device manager, the device manager being accessible using any of a plurality of IP addresses, the plurality of IP addresses including the IP address associated with the second communication device and each of the plurality of IP addresses corresponding to a different one of a plurality of communication devices that are accessible via the device manager;

the device manager determining, from the IP address, an identification that identifies the second communication device within a second network; and transmitting the information to the second wireless device using the identification.

8. The method of claim 7 wherein the first and second communication devices are wireless communication devices, and the network is a wireless network.

9. The method of claim 7 wherein the first network performs the receiving and first determining steps, and the second network is distinct from the first network and performs the transmitting and second determining steps.

10. The method of claim 7 wherein the network identification includes a domain name and a host name.

11. A system comprising:

a device manager assigned a set of network addresses, each network address uniquely identifying a communication device that communicates through a communication network;

the device manager being accessible to receive information using any of the set of network addresses;

when information is received by the device manager using a particular one of the set of network addresses, the device manager being further configured to determine a device identification corresponding to the particular one of the network addresses that identifies a particular communication device within the communication network and to transmit the information to the identified communication device using the device identification.

12. The system of claim 11 wherein the communication devices are wireless communication devices, and the network is a wireless network.

13. A system comprising:

means for receiving information and a network identification from a first communication device that communicates through a first network, the network identification uniquely identifying a second communication device that communicates through a second network;

means for determining an internet protocol (IP) address corresponding to the network identification;

means for using the IP address to transmit the information to a device manager, the device manager being accessible using any of a plurality of IP addresses, the plurality of IP addresses including the IP address associated with the second communication device and each of the plurality of IP addresses corresponding to a different one of a plurality of communication devices that are accessible via the device manager; and means for determining from the IP address an identification that identifies the second communication device within the second network and for transmitting the information to the second communication device using the identification.

14. The system of claim 13 wherein the first and second communication devices are wireless communication devices, and the network is a wireless network.

* * * * *